March 20, 1956  G. STEELE  2,738,563
SHUTTERING ASSEMBLY
Filed April 5, 1951  7 Sheets-Sheet 1

INVENTOR.
GEORGE STEELE
BY John James Victor Armstrong
Attorney

March 20, 1956     G. STEELE     2,738,563
SHUTTERING ASSEMBLY Filed April 5, 1951            7 Sheets-Sheet 3

INVENTOR.
GEORGE STEELE
BY John James Victor Armstrong
attorney

March 20, 1956  G. STEELE  2,738,563
SHUTTERING ASSEMBLY
Filed April 5, 1951  7 Sheets-Sheet 4

INVENTOR.
GEORGE STEELE
BY John James Victor Armstrong
Attorney

United States Patent Office 2,738,563
Patented Mar. 20, 1956

2,738,563

SHUTTERING ASSEMBLY

George Steele, Little Sutton, England, assignor to Sir Alfred McAlpine & Son Limited, Little Sutton, England, a British company Application April 5, 1951, Serial No. 219,337

Claims priority, application Great Britain April 6, 1950

16 Claims. (Cl. 25—131)

The present invention relates to the facing of concrete or the like.

In the facing of concrete it is common practice to support a shutter panel between two uprights or so called soldiers and to raise the shutter panel by sliding it up between the uprights in steps in order to place successive layers of concrete. It is quite common to use a plurality of uprights or soldiers with a plurality of shutter panels therebetween and after the placing of each layer to raise the shutters ready for the placing of the next layer. The shutter panels are necessarily fairly heavy and it is usually necessary to employ some form of lifting tackle, such as a crane, for raising the shutter panels.

One feature of the present invention consists of a method of placing concrete in which a shutter panel is pivoted in its upper end to its supporting uprights or soldiers and after the placing of one layer of concrete is raised to the next level by angular displacement of the panel about its pivotal axis. The shutter panel may then be re-pivoted to its supporting uprights or soldiers near the upper end which was previously the lower end.

A further feature of the invention consists of a double sided shutter panel provided with means adjacent opposite ends thereof to enable it to be pivoted between a pair of uprights. Preferably the said pivotal means are somewhat offset in opposite directions from the mid-thickness of the panel i. e. the pivot pins or the apertures or bearings for receiving pivot pins at the upper end are offset from the mid-thickness of the panel rearwardly away from the concrete to be placed whilst the apertures at the lower end are offset forwardly so that when the lower end becomes the upper end the apertures will be offset rearwardly. This offsetting of the pivots is for the purpose of enabling the panel to be angularly displaced without fouling the concrete already placed and to enable the lower end of the shutter after angular displacement slightly to overlap a layer of concrete already formed.

A shutter panel according to the present invention may be of any suitable and convenient construction provided that it is double sided and provided with pairs of pivotal means adjacent the opposite ends thereof i. e. the opposite ends which in use are, at different times, to be the upper and lower ends. The panel may be of any convenient size, for example six feet wide and four feet high, and may consist of a metal frame e. g. a frame of channel section with channel section stiffeners running in one direction and wooden braces at spaced intervals between the stiffeners and between the stiffeners and the frame. The facings on opposite sides may be of plywood.

Subsidiary metal frame elements may be provided at the upper and lower ends of the frame parallel to and inwardly spaced from the sides of the panel frame so that corresponding apertures through the sides of the frame and through the subsidiary frame elements will provide bearings for pivot pins which may be insertable and withdrawable.

The uprights or soldiers may each consist of pairs of channel sections arranged face to face with transverse cleats on the rear by means of which the shutter panel may be wedged into the correct position. The forward faces of the uprights should be sheathed with any suitable material such as plywood so that the shutter panel can be aligned with the facings of the uprights to form a continuous shuttering.

The first layer of concrete is preferably placed with threaded nuts embedded therein to receive threaded bolts or studs by means of which the uprights can be held in position and each layer or certain of the layers may likewise be provided with threaded nuts embedded therein to enable the uprights to be raised to new positions after each or after a predetermined number of layers of concrete have been placed.

The invention also includes a portable double lever device to facilitate the manual raising of the pivotal shutter panels of the present invention. This lever device may consist of a sole plate having a pivot lug or a pair of pivot lugs to which are pivoted the lower end of two levers which are interconnected with one another by means of a flexible tie such as a chain and to one of which is connected a further flexible tie such as a chain for connection to a free edge of a shutter panel to be raised. In use the device may be arranged with its sole plate on the surface of a layer of concrete already placed in position adjacent the pivoted end of the shutter panel. The free end of the second mentioned flexible tie may be attached to the free edge of the shutter panel to be raised and which will be depending approximately vertically downwardly. The length of the flexible connections are preferably such that with the connections taut and attached as indicated above one of the levers will extend approximately vertically upwards and the other will extend approximately horizontally outwards away from the layer of concrete already placed. By pulling on the first mentioned lever an operator may raise the shutter panel through an angle of 60° or 70° and may then grasp the second lever to complete the raising of the panel through approximately 180°. Preferably two such lever devices are used together so that an operator may use both hands to raise the shutter panel.

The invention also includes an improved upright or soldier which may be raised by pivoting whilst remaining at least in part supported by a layer of concrete already placed.

An improved upright or soldier according to the present invention consists of an adjustable polygonal structure formed of a plurality of upright or soldier sections, preferably of equal length, pivoted together at their adjacent ends by parallel pivots and provided with detachable means for holding the section in given relative dispositions to form a soldier of given polygonal shape e. g. triangular.

The soldier section may for example, consist of pairs of opposed channels.

In other words, an upright or soldier of the present invention consists of a number of soldier sections, preferably of equal length, pivoted together at their ends about parallel axes to enable the soldier to crawl up a concrete face in the manner that a track laying vehicle lays its tracks upon the ground (except that the sections are relatively long and few as compared with the tracks of a track laying vehicle) and provided that detachable means for holding all of the sections in predetermined relative positions so that certain of the sections are aligned in position for supporting a shutter panel with at least one of the sections attached to a layer of concrete already formed.

A preferred form of upright or soldier consists of five sections of equal length each of which may consist of a pair of metal channels arranged face to face. In the position of use two of the sections will be arranged in line and in an approximately upright position to form a vertical leg, two others will be arranged in line and will incline downwardly and rearwardly from the upper end of the vertical leg whilst the fifth will extend as a short leg between the lower ends of the above mentioned long legs. Thus the whole structure in the position of use will take the form of an isosceles triangle having one of its longer sides approximately vertical.

For holding the soldier structure in position an adjustable tie is provided to engage the hinge between the two sections of the vertical leg and the hinge between the short leg and the lower end of the inclined long leg, whilst a locating rod extends from the lower end of the upper section of the vertical leg to the hinge between the two sections forming the inclined leg.

The tie and locating rod may have hooked ends to facilitate their engagement with the hinge pins of said hinges.

An apertured plate may be provided on the inner face of each of the sections to enable them to be attached to the face of a layer of concrete already formed. Thus when the soldier is in the position of use it will be secured in position by a bolt passing through an apertured plate adjacent the upper end of the lower section of the upright leg of the structure. After the next layer of concrete has been placed the upper section of the upright leg of the structure will be secured to the layer of concrete last laid and the lower section will be released and the four sections of the soldier's structure which are not connected to the concrete layer will be angularly displaced to a new position in which the upper section of the inclined leg becomes the upper section of the upright leg.

The raising of the soldier may be carried out by the lever device described above whereupon the tie and the locating rod may be connected in position to hold the triangular structure in position.

The invention will be further described, by way of example with reference to the accompanying drawings in which.

In the drawings like reference numerals indicate like parts.

In order that the invention may be readily understood a method of applying the invention to the placing of concrete will now be described.

Figure 2:
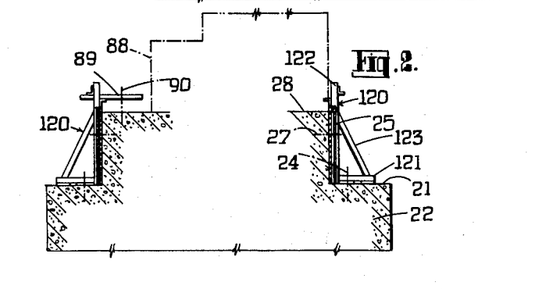
Fig. 2 is a diagrammatic representation in vertical section showing arrangements of panels and soldiers for placing certain layers of concrete to form steps or a vertical face rising from a base level.

Referring now to Fig. 2 which indicates diagrammatically in section one arrangement of panels and soldiers for the placing of a layer of concrete rising from a previously formed base such as an already placed and set slab 22. A plurality of soldiers 120 are placed upon the upper surface 21 of the slab 22. The soldier 120 includes a vertical member 122 and a horizontal portion 121 which is located by means of a nut and bolt indicated diagrammatically at 24 secured to the base slab 22, the horizontal and vertical members being interconnected by a brace 123. A series of panels 25 are disposed each one between two adjacent soldiers 120 in a manner hereinafter described so as to present a flat vertically extending surface. A nut and bolt assembly indicated diagrammatically at 27 is passed through an aperture formed in soldier 120 so as to extend inwardly into the space to be occupied by concrete when placed. An initial layer of concrete may now be placed and its upper surface may be as indicated at 23, whilst its vertical surface is determined by the panels 25.

Figure 3A:
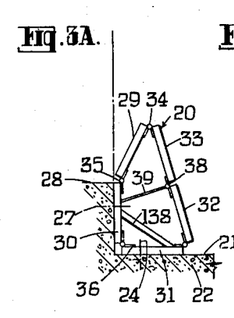
Fig. 3 is a diagrammatic representation in vertical section showing three successive stages in the placing of successive layers of concrete, the figure being divided into three parts, Fig. 3A, Fig. 3B and Fig. 3C.

Referring now to Fig. 3 which indicates diagrammatically in section arrangements of a polygonal soldier for the placing of an initial layer of concrete rising from a base and for subsequent placing of other layers thereon. Each soldier 20 is formed of five sections 29, 30, 31, 32 and 33 each of substantially equal length and pivoted at their adjacent ends by parallel pivots 34, 35, 36, 37 and 38. When a layer of concrete rising from a base slab 22 is to be placed each soldier 20 is initially secured to the slab 22 by means of a nut and bolt assembly 24 passing through an aperture in section 31 being then horizontally disposed. In each soldier a brace 138 is disposed between the sections 30 and 31 so as to retain section 30 more or less extending vertically, and to provide a more or less rigid structure, a safety link 39 is disposed between section 30, and pivot 38 which is intermediate sections 32 and 33. In each soldier a nut and bolt assembly 27 is inserted through an aperture in section 30 so as to extend into the space to be occupied by concrete when placed and a plurality of panels (as will be hereafter described) are disposed each one between two adjacent soldiers. A layer of concrete which may rise to the level as indicated at 28 is then placed, its vertical face being determined by the panels. The positions of the parts relative to one another at this stage are indicated diagrammatically in Figure 3A.

After the concrete has set, in each soldier 20, the nut and bolt assembly 27 is tightened so as to secure section 30 to the newly set layer of concrete, the nut and bolt assembly 24 is removed, the brace 138 is removed from between sections 30 and 31, and the safety link 39 between section 30 and pivot 38 is removed. The section 29 is caused, in a manner hereinafter described, to rotate about pivot 35 to bring it into a vertical position. Safety link 39 is then placed between pivots 35 and 38 and an additional link 40 is inserted between sections 30 and 32. A nut and bolt assembly 41 similar to the nut and bolt assembly 27 is now inserted through an aperture in section 29 so as to extend into the space to be filled when the next layer of concrete is placed and each of the panels previously extending through the height occupied by section 30 is swung angularly upwards so as now to extend through the height occupied by section 29. A second layer of concrete may now be placed having an upper surface as indicated at 42 its vertical face being bounded by the panels. The positions of the parts relative to one another at this stage are indicated diagrammatically in Fig. 3B.

After the second layer of concrete has set, in each soldier 20, the nut and bolt assembly 41 is tightened to secure section 29 against the face of the newly set concrete. Nut and bolt assembly 27 is loosened and removed. Safety link 39 is removed from between pivots 35 and 38 and link 40 is removed from between sections 30 and 32. The soldier may now be progressed in a manner similar to a track laying vehicle, that is to say, section 33 may be angularly displaced about pivot 34 so as to extend vertically above section 29 and section 30 may be angularly displaced to extend upwardly and outwardly away from the lower end of section 29. This movement may be readily achieved by displacement of the section 33 in a manner hereinafter described. The safety link 39 is then replaced between pivots 34 and 37 and the tie bar 40 between sections 29 and 31. The panels previously adjacent section 29 are angularly displaced so as to bring them adjacent section 33 and a further nut and bolt assembly 43 is placed through an aperture in each section 33 so as to extend into the space now to be filled with concrete. A further layer of concrete may now be placed to bring the upper level to 44. The positions of the parts relative to one another at this stage are indicated diagrammatically in Fig. 3C.

Figure 4:
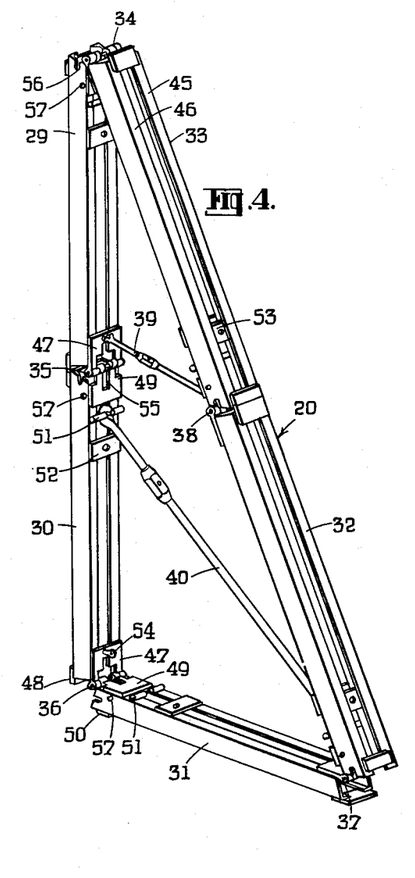
Fig. 4 is a perspective view of a polygonal soldier.

The various parts used, such as the soldiers and panels will now be described in greater detail. Referring to Fig. 4, the soldier 20 is formed of five sections 29, 30, 31, 32 and 33 each of substantially equal length, each substantially similar to one another and each conveniently formed of opposed channel section members such as 45 and 46 joined together at one end by means of hinge plate 47 and abutment plate 48, and at the other end by means of hinge plate 49 and abutment plate 50, hinge plates 47 and 49 being pivoted together by pivots such as 36. Adjacent that end of each section which is uppermost when the section is in the vertical position in use there is provided a bar 51 and, on one side of each panel section an apertured plate 52 and a similar apertured plate 53 in the space between the panel members. Screw eyes 54 are provided on each hinge plate 47 and are adapted to receive one end of safety link 39, the other end of which is adapted to be hooked around a pivot between hinge plates 47 and 49 of appropriate sections for which purpose a groove 55 is cut in each hinge plate 49. In Fig. 4 for example the link 39 extends from the hook on the hinge plate 47 on section 29 to the pivot 38 between sections 32 and 33. Additional tie bar 40 is provided with hook shaped ends adapted to be engaged around bars 51. The abutment plates 48 and 50 at adjacent ends of adjacent sections are so positioned that when they abut, the adjacent sections extend in substantially the same straight line. The upper ends of the panels forming each section are cut away as at 56 to receive tie bars as will be subsequently described and are drilled at 57 to receive pivot pins for panels as will also hereinafter be described.

Figure 5:
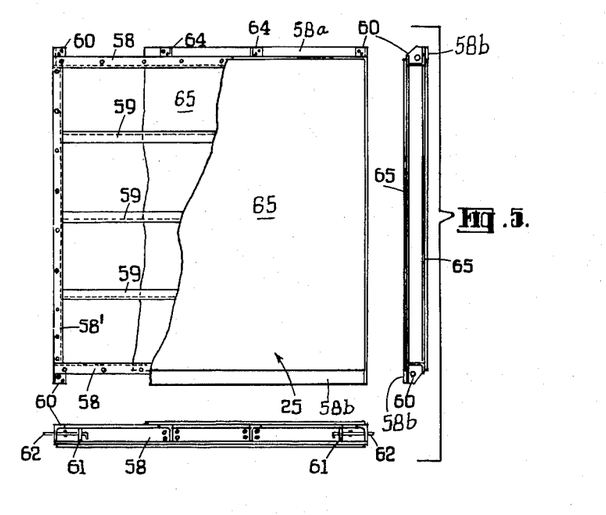
Fig. 5 is a plan, front elevation, and side elevation of a panel.
Figures 8, 12:
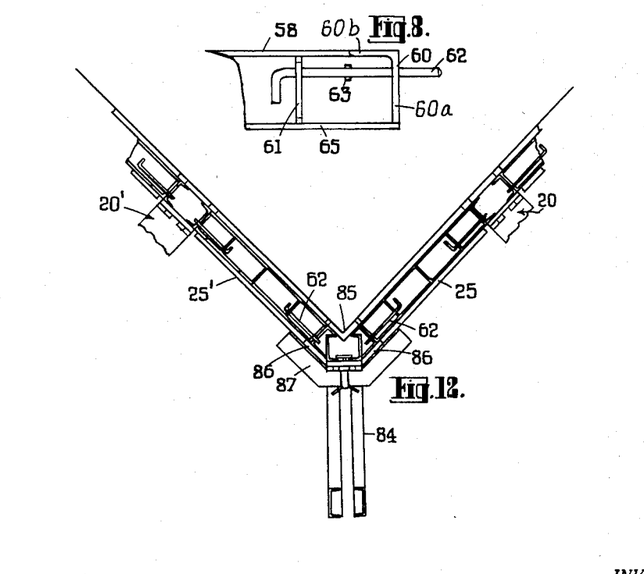
Fig. 8 is a detail to a further enlarged scale showing a method of fixing of pivotal means to a panel.
Fig. 12 is a plan view with certain parts removed for the sake of clarity showing diagrammatically the arrangement of a soldier and panels to form a corner.

A panel 25, (Fig. 5) which may be of any convenient size for example six feet wide and four feet high, comprises a framework of outwardly facing channel section members 58 with channel section stiffeners 59 extending between side members 58'. Additional members 60 (see also Fig. 8) of angle section are provided at the four corners each having one web 60a extending across the flanges of a side member 58 and the other web 60b extending along one flange of an end member 58, that is to say, along the rear flange 58a of the upper end member 58 or along the front flange 58b of the lower member 58. Additional plate members 61 are disposed in the upper and lower frame channel members so as to extend parallel to the side of the frame and be inwardly spaced from the members 60. The members 60 and 61 are apertured to receive pivot pins 62 which are insertable and withdrawable. Pivot pins 62 are generally L-shaped and are transversely bored to receive retaining means such as a split pin 63 (Fig. 8). Additional apertured members 64 are provided on the upper and lower frame channel members (Fig. 5). The panels are provided with facings 65 on opposite sides and these facings may be of plywood. The facings are not symmetrically disposed but each extends from the outer ends of the members 60 and 64 at one end of the panel to adjacent the outer edge of the flange of the end member 58 at the opposite end of the panel, as will be more clearly seen from the side elevation view in Fig. 5. In the panels shown in Fig. 5 the facings are substantially flat and substantially parallel to one another.

Figure 6:
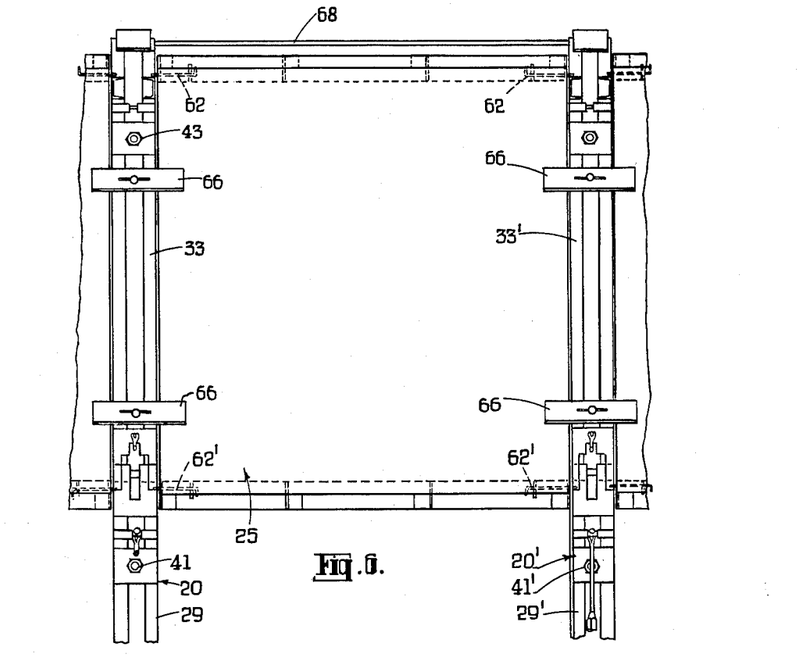
Fig. 6 is a front elevational detail view to an enlarged scale showing a panel connected to two uprights or soldiers with certain parts removed for the sake of clarity.
Figure 7:
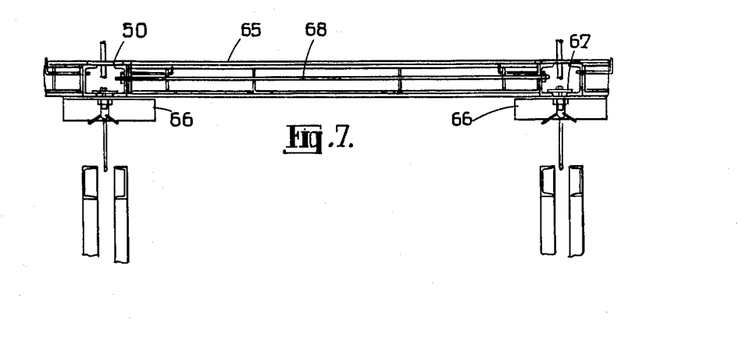
Fig. 7 is a plan view corresponding to Fig. 6 with certain parts removed for the sake of clarity.

The method of attaching the panels to the soldiers will be further described with reference to Figs. 6 and 7 which show two soldiers 20, 20' and a panel 25 therebetween. The parts are shown in their relative positions obtaining when a layer of concrete has been placed and preferably has set. The soldier 20 is secured to previously cast concrete by means of nut and bolt assembly 41 passing through section 29 thereof and the soldier 20' is secured by means of the nut and bolt assembly 41' passing through section 29' thereof. Panel 25 is connected to soldiers 20, 20' by pivot pins 62 received in sections 33 and 33'. Since the panel is progressed by rotation about the pivot pins it will be understood that when it was in the position for placing the previous layer of concrete the bottom edge of the panel 25 was previously its top edge and that it was connected to sections 29 and 29' by pins 62'. The panel 25 is prevented from rotation outwardly away from the concrete face by means of clamps 66 secured by means of bolts extending from bar shaped retaining plates 67 and abutting the inner faces of the opposed channel members forming the section so that the bolts and plates 67 can be readily inserted between or removed from between the channel members. The soldiers 20 and 20' are interconnected at their upper ends by means of tie rod 68 received in grooves 56 formed at the upper ends of the sections thereof. The purpose of the tie rod 68 is to assist in maintaining the correct spacing of the soldiers as they are progressed upwardly. Abutment plates 48 and 50 and the facing 65 of the panel 25 are preferably adapted to present a continuous surface for the incoming concrete and for this purpose a length of wooden shuttering is placed against the face of the section 33 between the abutment plates 50 and 48 so as to present a complete surface.

Figure 9:
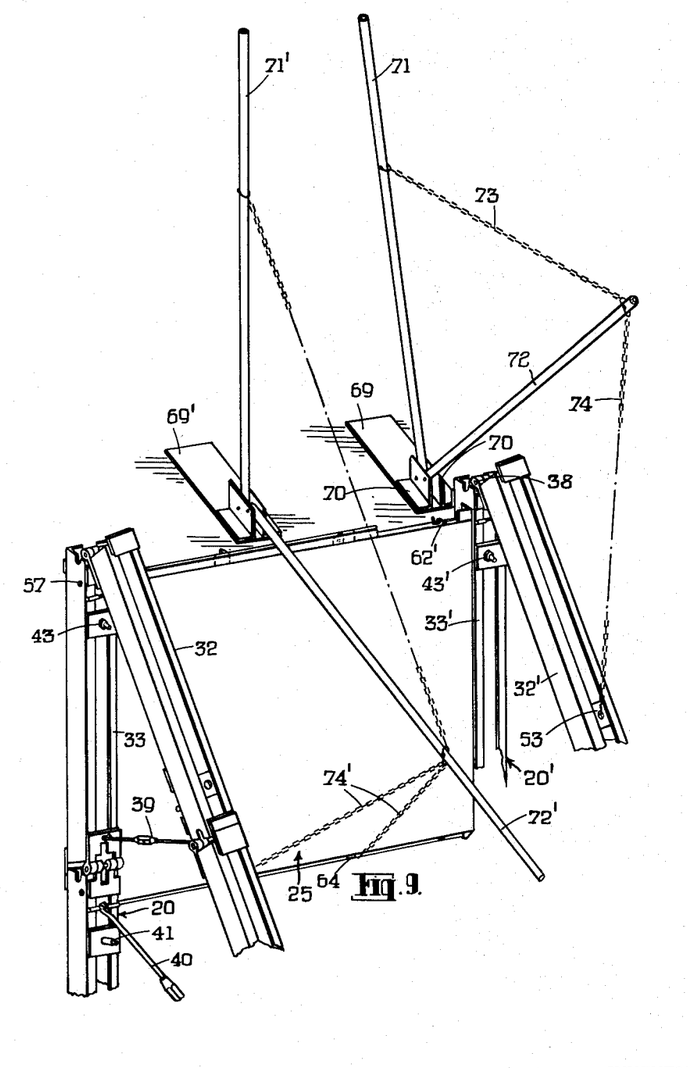
Fig. 9 is a diagrammatic perspective view showing one arrangement for progressing the soldiers and the panels.

Referring now to Fig. 9 the method of progressing the soldiers from one position to the next and of swinging the panel from one position to the next will now be described. Fig. 9 indicates diagrammatically the relative positions of parts after a layer of concrete has been placed and has set. Soldier 20 has been secured to the previously cast concrete by means of nut and bolt assembly 41. Nut and bolt assembly 43 which had previously been inserted before placing of the next layer of concrete is now tightened up to retain the soldier 20 against the layer just set and the nut and bolt assembly 41 is released. In a similar manner nut and bolt assembly 43' of soldier 20' is tightened and the nut and bolt assembly corresponding to 41 is released. The tie rod 40 is released and withdrawn and the safety link 39 is also removed. Similarly on soldier 20' the tie rod and safety link are released and withdrawn. A double lever device is now brought into use to effect manual progression of the soldiers and panel. The lever device comprises a sole plate 69 having a pair of pivot lugs 70 affixed thereto and to which are pivoted the lower ends of two levers 71, 72. Levers 71 and 72 are connected to one another by means of a flexible tie such as a chain 73 and there is also affixed to the lever 72 a further flexible tie such as a chain 74 for connection to a soldier section to be displaced such as by means of a hook inserted in the aperture in plate 53. By placing his foot on sole plate 69 an operator may restrain its movement and, by manipulating levers 71 and 72 in succession, may cause section 32' of soldier 20' to be rotated about pivot 38 until it extends vertically above section 33' when the safety link 39 may be replaced in a position equivalent to its previous position as hereinbefore described with reference to Fig. 3. The lever device may now be disconnected from the soldier 20′ and transferred to and manipulated in connection with another soldier, for example 20, this procedure being repeated until all necessary soldiers have been progressed into their next positions.

The clamps 66 restraining rotation of the panel 25 are now removed and the lever device is placed intermediate two soldiers in the position indicated by the sole plate 69′. Two flexible ties 74′ are attached to lever 72′ and are connected by means of hooks to apertured members 64 at the lower edge of the panel 25. By standing on sole plate 69 and operating in succession levers 71′ and 72′ the panel 25 may be caused to rotate about pivot pins 62′ which have previously been inserted through members 60 and 61 as indicated more clearly in Fig. 8 and through holes 57 in soldier sections 33, 33′, until the panel has been rotated through approximately 180° so that the surface of the panel which was previously on the outside is now brought to the inside and vice versa.

It is found convenient for the pivotal pin 62 to be offset somewhat away from the midthickness of the panel in such a manner that the pins and the apertures for receiving them at the upper edge of a panel are offset rearwardly away from the midthickness of the panel whilst those at the lower edge of a panel will be offset forwardly. This offsetting of the pivots enables the panel to be angularly displaced without fouling concrete already placed and moreover enables the lower end of a panel after angular displacement to overlap slightly the layer of concrete already placed.

After angular displacement of the panel through approximately 180°, fresh pivot pins are inserted through the aperatures in the members 60, 61 which are now at the top of the panel and which were previously at the bottom of the panel and through corresponding apertures 57 in the soldiers. The pivot pins about which the panel has been rotated and which are now at the bottom of the panel are now removed. Clamping members 66 may now be replaced but now at a higher level and with the bolt retaining plates abutting sections 32, 32′ so as to cause the panel to present a surface for concrete continuous with the previously presented surface.

Figure 1:
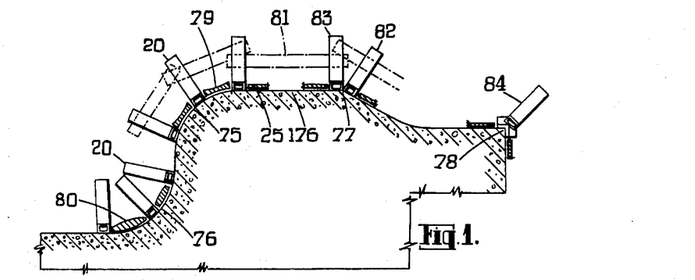
Fig. 1 is a diagrammatic representation in plan view showing certain arrangements of shuttering including panels and soldiers for the placing of concrete with variously shaped outlines.

In the form of panel described with reference to and illustrated in Fig. 5 the facings 65 are substantially flat and are in planes substantially parallel to one another thereby permitting the formation of a substantially continuous plane surface to the concrete when placed. However, it is necessary from time to time to place concrete so as to have in outline a concave or convex corner as indicated diagrammatically in Fig. 1, a convex curve being indicated diagrammatically at 75, and a concave curve at 76. Fig. 1 also shows a straight sided portion at 176 and corners at 77 and 78. When it is desired to form a curved portion, it is necessary for the opposite facings of the panels to be similarly curved in opposite directions, thus for forming a convex curved portion as at 75 the panels need to be concave in section, that is to say, thinner at their centre portion and thicker at their edges and this may be in cross-section as shown at 79. For forming a concave curved portion as at 76 the panels need to be convex in section, that is to say thicker at the centres than at their edges as shown at 80.

Figures 3B, 3C:
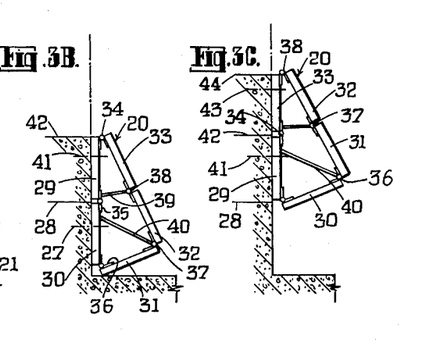

Moreover since the soldiers are normally attached to the previously placed and set concrete, the lowermost section of a soldier, that is to say, section 31 as shown in Fig. 3B, and 30 as shown in Fig. 3C, extends upwardly and outwardly away from the face of the concrete, and may serve as a support for planking or the like as indicated chain dotted at 81 in Fig. 1. Thus the soldiers may not only serve to support the panels for the placing of concrete, but they also provide supports for a working platform whereby access may be easily obtained to all parts of the apparatus and thereby obviating the erection of scaffolding to provide working platforms.

A corner or change in horizontal direction of surface of the vertical face of concrete may conveniently be arranged by providing two soldiers adjoining one another at the change of direction. This is indicated diagrammatically at 77 in Fig. 1 where soldiers 82 and 83 abut one another at the point of change of direction and each receives a pivot pin and clamps for a single panel. This is in contrast to the normal operation where it will be appreciated a soldier receives at one side the pivot pin of one panel and on the other side the pivot pin of another panel.

Whilst the arrangement of two soldiers abutting one another at a corner is practicable, it would be appreciated that a certain amount of difficulty may arise since the nut and bolt means securing the soldiers to the previously placed layer of concrete may be at substantially the same level and may interfere with one another. A more convenient arrangement is indicated diagrammatically at the corner 78 in Fig. 1 in which a single corner soldier 84 is disposed actually at the corner. The corner soldier 84 is indicated in greater detail in Fig. 12 and is constructed in a manner identical to the soldier 20 shown in Fig. 4 with the exception that the abutment plates 48 and 50 of soldier 20 are replaced by angular section abutment plates such as 85, and sideward extensions 86 are provided inclined to one another at the sides of the soldier sections to carry plates having faces normal to the surface of the concrete to receive pivot pins 62 of the panels 25, 25′ which may extend substantially at right angles one to another; the other sides of panels 25, 25′ are connected to normal soldiers 20, 20′ respectively. Clamps 66 shown in Figs. 6 and 7 are replaced by angle clamps 87.

Figure 10:
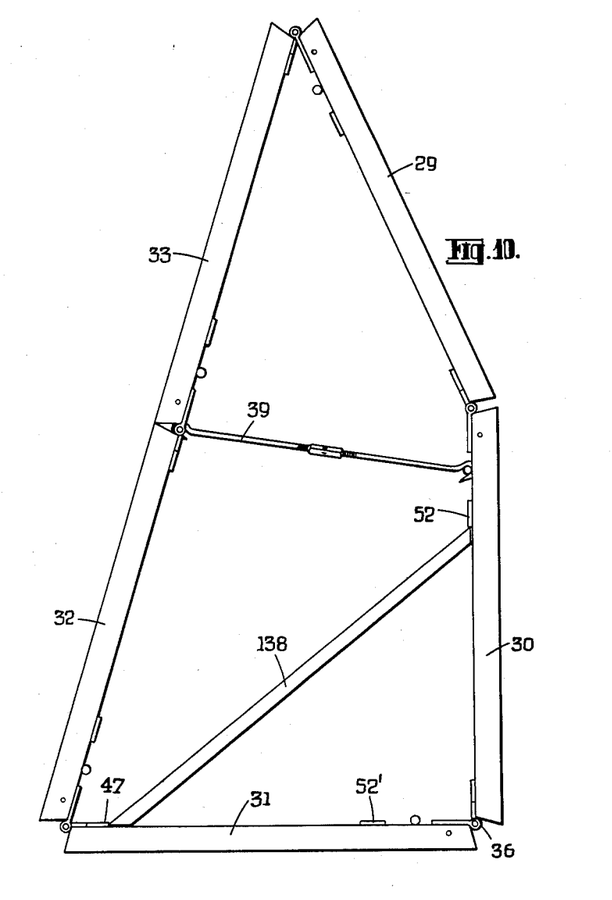
Fig. 10 is a side elevation of the soldier shown in Fig. 4 braced for use when a layer of concrete is to be placed on a previously formed base.

It is frequently necessary in construction work to place concrete to form a vertical face rising from a previously formed bottom layer such as a slab. If this bottom layer has a substantial upper surface it is necessary to provide a soldier having a substantially horizontal member and a substantial vertical member. As is shown diagrammatically in Figs. 3B and 3C the normal soldier 20 has when in its normal position of use a lowermost member extending upwardly and rearwardly from the vertical sections, and for the placing of an initial layer of concrete it is necessary either to provide a support soldier referred to as a braced soldier, purely for this purpose or to modify the normal soldier in such a manner that it may provide substantial horizontal and vertical directed sections. Such modification is indicated diagrammatically in Fig. 3A but more clearly to an enlarged scale in Fig. 10 wherein it will be seen that a bracing strut 138 is inserted between sections 30 and 31 so that it abuts the plate 52 on section 30 and the hinge plate 47 on section 31. The soldier may be secured to the slab or base by means of a nut and bolt assembly passing through the aperture plate 52′ on section 31.

Figure 11:
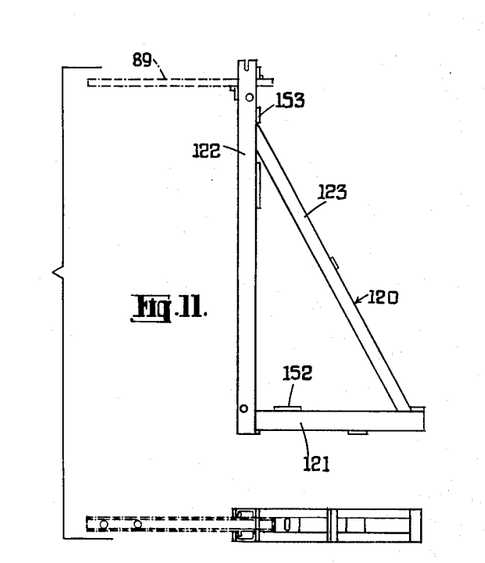
Fig. 11 is a diagrammatic side elevation and plan view of a braced soldier.

Alternatively for placing the lowermost section a braced soldier, as shown diagrammatically in Fig. 11 may be used. The braced soldier 120 is formed of a horizontal section 121, and a vertical section 122 connected to one another by a brace 123, the sections 121 and 122 being formed conveniently from opposed channel section members in a similar manner to the sections of the soldier 20 shown in Fig. 4. A plate 152 is provided on member 121 apertured to receive a nut and bolt assembly. Similarly the vertical member 122 may be provided with a similarly apertured plate 153 through which may be inserted an inwardly extending nut and bolt assembly to be received in the concrete about to be placed.

Referring now to Fig. 2 in addition to forming concrete with a continuous vertical face it is required from time to time to place concrete with a stepped face as indicated by the chain dotted line 88 at the left hand side of Fig. 2. The braced soldier 120 is well suited to such use and may be provided with removable inward extension 89 apertured to receive a vertically extending nut and bolt assembly so that this assembly may be retained in the next layer of concrete to provide a previously positioned nut and bolt assembly 90 for retaining the braced soldier on that layer preparatory to placing a subsequent layer.

Figures 13, 14:
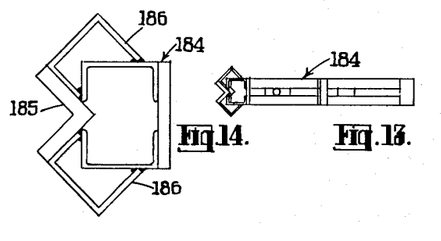
Fig. 13 is a diagrammatic plan view showing the use of a braced soldier when a corner is to be formed in placing certain layers of concrete.
Fig. 14 is a detail view to an enlarged scale of part of the corner soldier of Fig. 13.

For the formation of a corner at an initial layer of concrete a braced corner soldier 184 may be used as shown diagrammatically in Fig. 13 and to an enlarged scale in Fig. 14. The soldier 184 is provided with angle shaped abutments 185 and sideward extensions 186 in a manner similar to the soldier 84.

Whilst the panels on either side of the corner soldier 84 or of the braced corner soldier 184 may be more or less at right angles to one another as in the embodiments shown in Figs. 1, 12, 13 and 14 this is not essential and it will be understood that corner soldiers can readily be constructed to form corners with any desired included angle.

The nut and bolt assemblies used for retaining the soldiers may conveniently be formed of a length of rod threaded at both ends and screwed at one end to a retaining plate which may comprise a bored plate to which is attached a nut by means such as welding. The retaining plate with the rod attached is embedded in the concrete when it is placed. By providing a portion square or polygonal in cross-sectional shape at or adjacent its outer end the rod may by the application of a suitable tool such as a wrench be unscrewed from the retaining plate after use. The hole left by the removal of the rod may be filled in any known manner if required.

I claim:

1. A shuttering assembly for the placing of materials such as concrete, comprising at least two upwardly extending supports and at least one double-faced shutter panel, pivot receiving apertures formed in said supports and in said panel, said pivot receiving apertures in said panel being located adjacent the opposite ends of the sides thereof and offset at the upper end thereof from the mid-thickness of said panel rearwardly away from the concrete to be placed and offset at the lower end thereof forwardly, said pivot receiving apertures in said supports being spaced apart at intervals equal to the spacing of said pivot receiving apertures in said panel and being positioned to register with the apertures in the upper end of said panel when said panel is in position for placement of said concrete, pivot pins receivable in said registering pivot receiving apertures in said panel and supports permitting said panel to be pivotally suspended at its upper end between supports, means cooperating with said supports for selectively preventing angular movement about said pivot pins, whereby after placement of a layer of said concrete said panel can be progressively moved upwardly of the supports by angular displacement alone about said pivot pins to invert said panel whereupon other pivot pins can be inserted in the new top registering apertures and the lower pivot pins can be withdrawn and reinserted in other apertures in said panel and supports and subsequently again inverted.

2. A shuttering assembly for the placing of materials such as concrete, comprising at least two upwardly extending supports and at least one double-faced shutter panel, said supports and said panel having cooperating pivot means permitting the panel to be pivotally suspended between the supports, the pivot means of the panel being located adjacent the opposite ends thereof and offset from the mid thickness of said panel rearwardly away from the concrete to be placed at the upper end thereof and offset at the lower end thereof forwardly, and the pivot means of the supports being spaced apart at intervals equal to the spacing of the pivot means of the panel and cooperating with the top set of pivot means of said panel so that the panel can be progressively moved upwardly of the supports by angular displacement alone about the top set of pivot means to invert the panel, the lower end of said panel then becoming the upper end and the pivot means at said lower end becoming the pivot means at said upper end and offset rearwardly, whereupon it can be reconnected to the pivot means of the supports through another set of pivots and again inverted, and means cooperating with said supports for selectively preventing angular displacement of said panel about said pivot means.

3. A shuttering assembly for the placing of materials such as concrete, comprising at least two upwardly extending supports and at least one double-faced shutter panel, said supports and said panel having pivot means permitting the panel to be pivotally suspended between the supports, the pivot means of the panel being located adjacent the opposite ends thereof and the pivot means of the supports being spaced apart at intervals equal to the spacing of the pivot means of the panel whereby the panel can be progressively moved upwardly of the supports by angular displacement alone about one set of pivots to invert the panel, whereupon it can be reconnected to the supports through another set of pivots and again inverted, each of said supports including a plurality of sections of substantially equal length, substantially parallel pivotal means at adjacent ends of adjacent sections pivotally connecting said sections to form a polygonal structure of adjustable shape and detachable link means for holding the sections in given relative dispositions to form an upwardly extending support of given polygonal shape, whereby said upwardly extending support can be progressively moved upwardly by rotation of at least one of said sections about the pivotal means at one end thereof to cause said support to crawl up a concrete face trackwise in the manner that a track laying vehicle lays its tracks upon the ground.

4. A shuttering assembly for the placing of materials such as concrete, comprising at least two upwardly extending supports and at least one double-faced shutter panel, pivot receiving apertures formed in said supports and in said panel, said pivot receiving apertures in said panel being located adjacent the opposite ends of the sides thereof, said pivot receiving apertures in said supports being spaced apart at intervals equal to the spacing of said pivot receiving apertures in said panel, pivot pins receivable in said pivot receiving apertures in said panel and supports, said upwardly extending supports each including five sections of substantially equal length, substantially parallel pivotal means at adjacent ends of adjacent sections to form a polygonal structure of adjustable shape and detachable link means between said sections and said pivotal means for holding said sections in given relative disposition to form an upwardly extending support in the shape of an isosceles triangle having one of its longer sides approximately vertical.

5. A shuttering assembly for the placing of materials such as concrete, comprising at least two upwardly extending supports and at least one double-faced shutter panel, pivot receiving apertures formed in said supports and in said panel, said pivot receiving apertures in said panel being located adjacent the opposite ends of the sides thereof, said pivot receiving apertures in said supports being spaced apart at intervals equal to the spacing of said pivot receiving apertures in said panel, pivot pins receivable in said pivot receiving apertures in said panel and supports permitting said panel to be pivotally suspended between said supports, said upwardly extending supports each including five sections of substantially equal length, substantially parallel pivotal means at adjacent ends of adjacent sections pivotally connecting said sections to form a polygonal structure of adjustable shape and detachable link means between said sections and said pivotal means for holding said sections in given relative disposition to form an upwardly extending support in the shape of an isosceles triangle having one of its longer sides approximately vertical, whereby said upwardly extending support can be progressively moved upwardly by rotation of at least one of said sections about the pivotal means at one end thereof to cause said support to crawl up a concrete face trackwise in the manner that a track laying vehicle lays its tracks upon the ground, and said panel can be progressively moved upwardly of the supports by rotation about said pivot pins to invert said panel whereupon said pivot pins can be withdrawn and reinserted in other apertures in said panel and supports and subsequently again inverted.

6. A shuttering assembly for the placing of materials such as concrete, comprising at least two upwardly extending supports and at least one double-faced shutter panel, pivot receiving apertures formed in said supports and in said panel, said pivot receiving apertures in said panel being located adjacent the opposite ends of the sides thereof, said pivot receiving apertures in said supports being spaced apart at intervals equal to the spacing of said pivot receiving apertures in said panel, pivot pins receivable in said pivot receiving apertures in said panel and supports permitting said panel to be pivotally suspended between said supports, said upwardly extending supports each including five sections of substantially equal length, substantially parallel pivotal means at adjacent ends of adjacent sections pivotally connecting said sections to form a polygonal structure of adjustable shape and detachable link means between said sections and said pivotal means for holding said sections in given relative disposition to form an upwardly extending support in the shape of an isosceles triangle having one of its longer sides approximately vertical, means for attaching to previously placed and set concrete those sections of the upwardly extending supports next below the uppermost of those forming said approximately vertical longer side, and removable clamps removably attachable to said sections to restrain rotation of said panel away from concrete to be placed thereagainst, whereby said upwardly extending support can be progressively moved upwardly by rotation of at least one of said sections about the pivotal means at one end thereof to cause said support to crawl up a concrete face trackwise in the manner that a track laying vehicle lays its tracks upon the ground, and said panel can be progressively moved upwardly of the supports by rotation about said pivot pins to invert said panel whereupon said pivot pins can be withdrawn and reinserted in other apertures in said panel and supports and subsequently again inverted.

7. In a shutter assembly supporting a shutter for placing of materials such as concrete; supports adapted to support a shutter each such support including a plurality of sections preferably of substantially equal length, substantially parallel pivot means joining adjacent ends of adjacent sections to form polygonal structures of adjustable shape, and detachable link means for holding the sections in given relative dispositions to form an upwardly extending support of given polygonal shape whereupon said upwardly extending support can be progressively moved upwardly by rotation of at least one of said sections about said pivot means at one end thereof to cause the support to crawl up a concrete face trackwise in the manner that a track laying vehicle lays its tracks upon the ground.

8. In a shutter assembly supporting a shutter for placing of materials such as concrete; at least two upwardly extending supports adapted to support a shutter, each such upwardly extending support including five sections of substantially equal length, substantially parallel pivot means forming adjacent ends of adjacent sections to form a polygonal structure of adjustable shape, and detachable link means between said sections and said pivot means for holding said sections in given relative disposition to form an upwardly extending support in the shape of an isosceles triangle having one of its longer sides approximately vertical, whereby each such upwardly extending support can be progressively moved upwardly by rotation of at least one of said sections about the pivot means at one end thereof to cause the support to crawl up a concrete face trackwise in the manner that a track laying vehicle lays in its tracks upon the ground.

9. In a shutter assembly supporting a shutter for placing of materials such as concrete; at least two upwardly extending shutter panel supports each of said upwardly extending supports adapted to support a shutter, each such support including five sections of substantially equal length, substantially parallel pivot means joining adjacent ends of adjacent sections to form a polygonal structure of adjustable shape and detachable link means between said sections and said pivot means for holding said sections in given relative disposition to form an upwardly extending support in the shape of an isosceles triangle having one of its longer sides approximately vertical, means for attaching to previously placed and set concrete the section of each of the upwardly extending supports next below the uppermost of those forming said approximately vertical longer side, whereby said upwardly extending support can be progressively moved upwardly by rotation of at least one of said sections about the pivot means at one end thereof to cause said support to crawl up a concrete face trackwise in the manner that a track laying vehicle lays its tracks upon the ground.

10. In a shutter assembly supporting a shutter for placing of materials such as concrete; at least two upwardly extending supports, each such support including a plurality of sections preferably of substantially equal length, substantially parallel pivot means joining adjacent ends of adjacent sections to form polygonal structures of adjustable shape, and detachable link means for holding the sections in given relative disposition to form an upwardly extending support of given polygonal shape, a shutter panel to define one boundary of successive layers of material, means for supportably attaching said panel selectively to sections of supporting uprights, and means for attaching to previously placed and set concrete the section of each of the upwardly extending supports next below the uppermost of those forming said approximately vertical longer side, whereby said upwardly extending support can be progressively moved upwardly by rotation of at least one of said sections about the pivot means at one end thereof to cause said support to crawl up a concrete face trackwise in the manner that a track laying vehicle lays its tracks upon the ground.

11. In a shutter assembly supporting a shutter for placing of materials such as concrete; at least two upwardly extending supports, each such support including five sections preferably of substantially equal length, substantially parallel pivot means joining adjacent ends of adjacent sections to form polygonal structures of adjustable shape, and detachable link means for holding the sections in given relative disposition to form an upwardly extending support of given polygonal shape, a shutter panel to define one boundary of successive layers of material, means for supportably attaching said panel selectively to sections of supporting uprights, and means for attaching to previously placed and set concrete the section of each of the upwardly extending supports next below the uppermost of those forming said approximately vertical longer side, whereby said upwardly extending support can be progressively moved upwardly by rotation of at least one of said sections about the pivot means at one end thereof to cause said support to crawl up a concrete face trackwise in the manner that a track laying vehicle lays its tracks upon the ground.

12. In a shutter assembly supporting a shutter for placing of materials such as concrete; at least two supports adapted to be placed in substantially parallel upwardly extending relationship to support the shutter between them, each support comprising at least five sections, substantially parallel pivot means joining adjacent ends of adjacent sections to form a uniplanar polygonal structure non-rigid in said plane, readily detachable tie links adapted to be placed between said sections to selectively rigidly fix the structure with the sections in predetermined relative dispositions to form an upwardly extending support of predetermined polygonal shape, and means to prevent the relative rotation of any two adjacent sections substantially beyond the point where the polygon becomes a re-entrant figure.

13. In a shutter assembly supporting a shutter for placing of materials such as concrete; at least two supports adapted to be placed in substantially parallel upwardly extending relationship to support the shutter between them, each support comprising at least five sections, substantially parallel pivot means joining adjacent ends of adjacent sections to form a uniplanar polygonal structure non-rigid in said plane, readily detachable tie links adapted to be placed between said sections to selectively rigidly fix the structure with the sections in predetermined relative dispositions to form an upwardly extending support of predetermined polygonal shape, said pivot means being disposed adjacent the inside faces of said ends of said sections to allow relative rotation of adjacent sections in said plane and to cause ends of adjacent sections to abut when the said adjacent sections are substantially co-linear.

14. In a shutter assembly supporting a shutter for placing of materials such as concrete; at least two supports adapted to be placed in substantially parallel upwardly extending relationship to support the shutter between them, each support comprising at least five sections, substantially parallel pivot means joining adjacent ends of adjacent sections to form a uniplanar polygonal structure non-rigid in said plane, readily detachable tie links adapted to be placed between said sections to selectively rigidly fix the structure with the sections in predetermined relative dispositions to form an upwardly extending support of predetermined polygonal shape, said pivot means passing through said ends, and abutments on the outer fronts of said sections adjacent the ends thereof, the abutments adjacent the ends of adjacent sections being arranged to abut one another when said adjacent sections become substantially co-linear thereby preventing rotation of the sections about the pivot means therebeyond.

15. In a shutter assembly supporting a shutter for placing of materials such as concrete; at least two supports adapted to be placed in substantially parallel upwardly extending relationship to support the shutter between them, each support comprising five sections of substantially equal length, substantially parallel pivot means joining adjacent ends of adjacent sections to form a non-rigid polygonal structure, readily detachable links of adjustable length adapted to be placed between said sections to selectively rigidly fix the structure with the sections in predetermined relative dispositions to form an upwardly extending support of predetermined polygonal shape having one section adapted to face previously placed and set concrete and another section adapted to face concrete to be subsequently placed and set, means intermediate the center of each section and that end thereof which is the upper end when that section is adjacent the face of said concrete for attaching said section to said concrete, whereby upon attaching to subsequently placed and set concrete that section which is adjacent the face thereof and upon detaching from previously placed and set concrete that section adjacent the face thereof and upon temporary detachment of said links each upwardly extending support can be moved upwardly by rotation of sections thereof about the ends of the section attached to the subsequently placed and set concrete to cause said support to crawl up a concrete face trackwise in a manner that a track laying vehicle lays its tracks upon the ground.

16. In a shutter assembly supporting a shutter for placing of materials such as concrete; at least two supports adapted to be placed in substantially parallel upwardly extending relationship to support the shutter between them, each support comprising five sections of substantially equal length, substantially parallel pivot means joining adjacent ends of adjacent sections to form a uniplanar polygonal structure non-rigid in said plane, two readily detachable links adapted to be placed between said sections to selectively rigidly fix the structure with the sections in predetermined relative dispositions to form an upwardly extending support generally in the shape of an isosceles triangle, with two of said sections forming a substantially vertical side of the triangle, with a further two of said sections forming another adjacent side of the triangle and with the remaining section forming a third side of the triangle, means for attaching to previously placed and set concrete the section of each of the upwardly extending supports which is the lower of those forming said substantially vertical side of the triangle, means for attaching to subsequently placed and set concrete the section of each of the upwardly extending supports which is the upper of those forming said substantially vertical side of the triangle, means on each of said sections intermediate the center of each section and that end thereof which is the upper end when that section forms part of said substantially vertical side of the isosceles triangle for receiving said attaching means, whereby upon detachment of said lower section of those forming said substantially vertical side of the triangle from the concrete and upon temporary detachment of said tie links each upwardly extending support can be moved upwardly by rotation of sections thereof about said upper section which remains stationary and attached to said subsequently placed and set concrete during said rotation of sections to cause said support to crawl up a concrete face trackwise in the manner that a track-laying vehicle lays its tracks upon the ground.

References Cited in the file of this patent

UNITED STATES PATENTS

| | | |
|---|---|---|
| 1,562,465 | Nelson | Nov. 24, 1925 |
| 1,761,055 | Selway | June 3, 1930 |
| 1,918,182 | Eiler | July 11, 1933 |
| 2,493,264 | Records | Jan. 3, 1950 |
| 2,562,403 | Ahart | July 31, 1951 |

FOREIGN PATENTS

| | | |
|---|---|---|
| 140,581 | Great Britain | Apr. 1, 1920 |
| 231,376 | Great Britain | Apr. 2, 1925 |
| 293,164 | Great Britain | July 5, 1928 |